3,051,690
PROCESS FOR POLYMERIZING OLEFINS WHERE-
IN HYDROGEN IS UTILIZED AS A MOLECULAR
WEIGHT CONTROL AGENT
Edwin J. Vandenberg, Wilmington, Del., assignor to Hercules Powder Company, Wilmington, Del., a corporation of Delaware
No Drawing. Filed July 29, 1955, Ser. No. 525,364
23 Claims. (Cl. 260—88.2)

This invention relates to an improved process for the polymerization of olefins under relatively mild conditions of pressure and temperature and, more particularly, to a method of controlling the molecular weight of the polyolefins produced so that the polymer may be produced in any desired range of molecular weight.

In U.S. applications of K. Ziegler et al., Serial No. 469,059, filed November 15, 1954; Serial No. 482,412, filed January 17, 1955; and Serial No. 482,413, filed January 17, 1955, there is described a new process of polymerizing ethylene to a high molecular weight polyethylene under relatively mild conditions of temperature and pressure by using as the catalyst for the polymerization a mixture of a compound of a metal of groups IV–B, V–B, VI–B or VIII of the periodic table, or manganese, in combination with an organometallic compound of an alkali metal, alkaline earth metal, zinc, earth metal (especially aluminum), or rare earth metal. The process is usually carried out by mixing the two catalyst components in a hydrocarbon diluent and then passing the ethylene into the catalyst mixture at atmospheric or slightly elevated pressure and at room temperature or moderately elevated temperatures. This process is so effective that ethylene is rapidly polymerized to a polymer of very high molecular weight, frequently within the range of 300,000 to 3,000,000 or higher. Such polymers have very high viscosities, melting point, etc. For many purposes, as for example, in plastic molding, a lower molecular weight polymer, i.e., within the range of 30,000 to 300,000 is desired.

Now, in accordance with this invention, it has been found that the molecular weight of the polymer, as indicated by its viscosity, may be controlled within any desired range by the addition of a controlled amount of hydrogen to the above polymerization systems. This process is not only applicable to the polymerization of ethylene but also for the polymerization of any ethylenically unsaturated hydrocarbon. The use of hydrogen as a viscosity reducer in accordance with this invention is of particular advantage in the improvement on the above-mentioned Ziegler process described in my copending applications Serial No. 500,041, filed April 7, 1955, and Serial No. 525,363, filed of even date herewith, wherein two-component catalyst systems are used in the polymerization of olefins. The catalyst system of the first of these applications comprises a mixture of (1) the hydrocarbon-insoluble reaction product obtained by the reaction of a compound of a metal of groups IV–B, V–B, VI–B, and VIII of the periodic table or manganese with an organometallic compound of an alkali metal, alkaline earth metal, zinc, earth metal, or rare earth metal, and (2) an organometallic compound of an alkali metal, alkaline earth metal, zinc, earth metal, or rare earth metal. In accordance with the invention of the second application, the hydrocarbon-insoluble reaction product does not have to be separated and instead the mixture of reaction products may be used as one component of the catalyst system for the polymerization of 1-olefins, if a halogen-free organometallic compound is used as the second catalyst component. Of such two-component catalyst systems the effect of hydrogen is most outstanding when the hydrocarbon-insoluble reaction product or mixture of reaction products is used in conjunction with an aluminum trialkyl or other halogen-free metal alkyl such as lithium butyl. The molecular weight of the polymers produced in such two-component catalyst systems is very high and it is frequently difficult to lower it to the viscosity range normally desired for plastic molding. By adding hydrogen to the polymerization system in accordance with this invention, it is possible to easily bring the molecular weight down to the desired level.

Any ethylenically unsaturated hydrocarbon or mixtures thereof may be polymerized by the process of this invention, as for example, hydrocarbons containing vinylidene, vinyl, or vinylene groups. The invention is of particular importance for the polymerization of monoethylenically unsaturated hydrocarbons wherein the unsaturated group is a vinylidene group, which compounds have the general formula

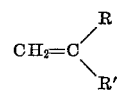

where R is alkyl and R' is alkyl, cycloalkyl, aralkyl, aryl, or alkaryl and those wherein the vinylidene group is a vinyl group, which compounds have the general formula $CH_2=CHR$ where R is hydrogen, a linear alkyl, a branched chain alkyl, cycloalkyl, aryl, aralkyl, or alkaryl, and for the polymerization of polyethylenically unsaturated hydrocarbons such as conjugated diolefins. Exemplary of the ethylenically unsaturated hydrocarbons which may be polymerized are the linear 1-olefins such as ethylene, propylene, butene-1, hexene-1, heptene-1, octene-1, octadecene-1, dodecene-1, etc., and branched chain 1-olefins and other olefins such as isobutylene, cis-butene, diisobutylene, tert-butylethylene, 4- and 5-methyl-heptenes-1, tetramethylethylene, and substituted derivatives thereof such as styrene, α-methylstyrene, vinylcyclohexane, diolefins such as hexadiene-1,4,6-methylheptadiene-1,5 and conjugated diolefins such as butadiene, isoprene, pentadiene-1,3, cyclic olefins such as cyclopentadiene, cyclohexene, 4-vinylcyclohexene-1, β-pinene, etc.

The polymerization of the ethylenically unsaturated hydrocarbon may be carried out in a wide variety of ways. The process may be carried out as either a batch or continuous operation and with or without the use of an inert organic diluent as the reaction medium. With the more volatile monomers, a diluent is usually preferred. Any inert liquid organic solvent may be used, as for example, aliphatic hydrocarbons such as hexane, heptane, etc., cycloaliphatic hydrocarbons such as cyclohexane, aromatic hydrocarbons such as benzene, toluene, xylene, etc., or any mixture of such hydrocarbons, halogenated aromatic hydrocarbons such as chlorobenzenes, chloronaphthalenes, etc.

The selection of the temperature and pressure used for the polymerization process will obviously depend upon the monomer, the activity of the catalyst system being used, the degree of polymerization desired, etc. In general, the polymerization will be carried out at room temperature or slightly above, but any temperature within the range of from about —50° C. to about 150° C. and preferably from about —20° C. to about 100° C. may be used. In the same way, while atmospheric pressure or a pressure of only a few pounds may be used, the polymerization may be carried out over a wide range of pressures, as for example, from a partial vacuum to about 1000 lbs. and preferably from about atmospheric to about 500 lbs. pressure. Higher pressures may, of course, be used, but generally do not appreciably alter the course of the polymerization.

The polymerization of the olefin in accordance with this invention may be carried out by mixing the transition metal compound and the organometallic compound, usually in an inert organic diluent, and then adding the olefin to the reaction mixture, the hydrogen being added either prior to or during the addition of the olefin. As already pointed out, the transition metal compound may be a compound of any metal of groups IV–B, V–B, VI–B or VIII of the periodic table, i.e., titanium, zirconium, hafnium, thorium, vanadium, columbium, tantalum, chromium, molybdenum, tungsten, uranium, iron, cobalt, nickel, etc., or manganese. The compound may be an inorganic salt such as a halide, oxyhalide, etc., or an organic salt or complex such as an acetylacetonate, etc. Of particular value are the metal halides such as titanium tetrachloride. Exemplary of the transition metal compounds that may be used are titanium and zirconium tetrachloride, manganous chloride, nickelous chloride, ferrous chloride, ferric chloride, tetrabutyl titanate, zirconium acetylacetonate, vanadium oxy acetylacetonate, chromium acetylacetonate, etc. The organometallic compound that is reacted with one of the transition metal compounds or mixtures thereof may be any organo compound of an alkali metal, alkaline earth metal, zinc, earth metal, or rare earth metal, as for example, alkali metal alkyls or aryls such as butyllithium, amylsodium, phenylsodium, etc., dimethylmagnesium, diethylmagnesium, diethylzinc, butylmagnesium chloride, phenylmagnesium bromide, triethylaluminum, tripropylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diethylaluminum hydride, ethylaluminum dihydride, diisobutylaluminum hydride, etc., and complexes of such organometallic compounds, as for example, sodium aluminum tetraethyl, lithium aluminum tetraoctyl, etc.

When the transition metal compound and the organometallic compound are mixed, a reaction takes place which is believed to be a reduction of the transition metal compound from the higher valence state of the transition metal to one or more lower valence states. The molar ratio of the organometallic compound to the transition metal compound may be varied over a wide range, but there should be used an amount of the organometallic compound that will produce the desired amounts of reduction. Thus, larger ratios of organometallic compound to the transition metal compound are required for alkali metal alkyls than for trialkylaluminum compound, and in the same way more of an alkyl aluminum dihalide is required than of a dialkylaluminum monohalide. In general, the molar ratio of organometallic compound to transition metal compound will be from about 0.1:1 to 100:1 and more usually will be from about 0.3:1 to 10:1.

Another method of carrying out the polymerization process of this invention is to use a two-component catalyst system as mentioned above. In one case the insoluble precipitate which is formed by mixing the transition metal compound and organometallic compound as described above is separated and then used in combination with an organometallic compound. The insoluble reaction product will be readily separated, if the reaction took place in an inert diluent, from the diluent and soluble reaction by-products by centrifuging, filtering, or any other desired means. In some cases it may be desirable to wash the insoluble reaction product with additional amounts of hydrocarbon diluent in order to completely remove all of the soluble by-products. This hydrocarbon-insoluble reaction product is then used in combination with any organometallic compound of a metal selected from the group of alkali metals, alkaline earth metals, zinc, earth metals, and rare earth metals, which compounds have already been exemplified above. This second catalyst component may be the same organometallic compound that was used in preparing the insoluble reaction product catalyst component or it may be a different organometallic compound. As already mentioned, and of particular importance, is the use of such a hydrocarbon-insoluble reaction product in combination with an aluminum trialkyl such as triethylaluminum, triisobutylaluminum, trioctylaluminum, etc.

In the second two-component catalyst system, the whole reaction mixture formed on mixing a transition metal compound and an organometallic compound may be used in combination with an organometallic compound, if the latter is halogen-free. This two-component catalyst system is particularly useful for the polymerization of linear 1-olefins. Suitable halogen-free organometallic compounds that may be used as the second catalyst component in this system are alkali metal alkyls such as butyllithium, amylsodium, etc., dialkylmagnesium compounds such as dimethylmagnesium, diethylmagnesium, etc., alkylaluminum hydrides such as diisobutylaluminum hydride, etc., and trialkylaluminums such as trimethylaluminum, triethylaluminum, triisobutylaluminum, trioctylaluminum, etc.

When a two-component catalyst combination is used, the amount of each of the two catalyst components used in carrying out the polymerization will depend, in general, upon the monomer being polymerized, whether a batch or continuous polymerization process is used, whether they are mixed all at once, or in the batch process, one or both are added in increments, or in the continuous process, one or both are continuously added. In general, the amount of the insoluble transition metal catalyst component or mixture of reaction products will be within the range of from a minor catalytic amount to a large excess, as for example, from about 0.1 to about 1000 millimoles per mole of monomer and in the batch process may be from about 0.1 millimole per liter of reaction mixture to about 100 millimoles per liter, and in some types of continuous operation even higher concentrations might be used. The amount of the organometallic catalyst component added will depend not only on the above variations but also on the activity of the organometallic compound being added. Usually the molar ratio of organometallic catalyst component to the insoluble transition metal catalyst component will be within the range of from about 0.05:1 to about 100:1, and preferably from about 0.2:1 to about 20:1.

The polymerization process may be carried out in a wide variety of ways, as for example, either as a batch or continuous operation and with or without the use of an inert organic diluent as the reaction medium. Usually a diluent is preferred for carrying out the process. Any inert liquid organic solvent may be used as the diluent, as for example, aliphatic hydrocarbons such as hexane, heptane, isooctane, etc., cycloaliphatic hydrocarbons such as cyclohexane, aromatic hydrocarbons such as benzene, toluene, xylene, etc., or any mixture of such hydrocarbons, or halogenated aromatic hydrocarbons such as chlorobenzenes, chloronaphthalenes, etc. As pointed out already, the transition metal compound and the organometallic compound may be reacted in situ, as for example, in the particularly effective method of polymerizing diolefins wherein a trialkylaluminum is reated in situ with a tetraalkyl titanate. They may also be reacted prior to the introduction of the olefin or they may be reacted and then used in combination with additional organometallic compound. They may also be added in increments during the polymerization and many other such variations may be utilized.

By the addition of hydrogen to any of the above polymerization systems, it is possible to control the molecular weight of the polymer produced. Thus by the addition of small amounts of hydrogen it is possible to only slightly reduce the molecular weight and with larger amounts of hydrogen the molecular weight may be quite drastically reduced. The hydrogen may be added all at one time in the beginning of the polymerization or at some stage during the polymerization, or it may be added in increments during the polymerization process or continuously throughout the polymerization process, or it may be mixed with an inert gas such as nitrogen or with a gaseous monomer and sparged through the reaction mixture, or maintained as a blanket over the reaction mixture. The amount of hydrogen added will, of course, depend upon the desired amount of reduction in the molecular weight of the polymer over that produced when no hydrogen is present, the catalyst used, monomer, temperature, hydrogen pressure, etc. For example, propylene and the higher olefins are much more sensitive to the effects of hydrogen than is ethylene; hence, even very small amounts of hydrogen will effect a very great reduction of the molecular weight of polypropylene, whereas ten times or more that amount may be required to effect a comparable reduction in the molecular weight of polyethylene. In general, the amount of hydrogen added will be at least about 0.001 mole percent of the monomer or monomers present in the polymerization system and preferably will be from about 0.01 mole percent to about 99 mole percent and more preferably from about 0.1 mole percent to about 90 mole percent of the monomer content of the polymerization system. In some instances it may be preferred to maintain a certain hydrogen pressure on the system and then, in the case of gaseous monomers such as ethylene, add the monomer at a somewhat higher total pressure. In such a system the lowest molecular weight will be obtained when the monomer pressure is small compared to the hydrogen pressure. Any hydrogen pressure may be used up to that at which extensive hydrogenation of the monomer occurs but preferably will not exceed about 200 p.s.i.a. In the case of gaseous monomers containing inert gases or where gaseous inerts are formed during the reaction, which inerts build up in the polymerization system as the monomer polymerizes and hence alter the concentrations, it may be desirable to maintain a constant monomer and hydrogen pressure (a greater total pressure) or to sparge out the inert gases from the system along with part or all of the hydrogen and then add fresh hydrogen. After the polymerization reaction is complete, the unreacted hydrogen may be recovered and re-used as such or after purification. Hydrogen or its ordinary isotopic mixtures may be used in accordance with this invention, as for example, hydrogen enriched in deuterium. Mixtures of hydrogen and inert gases such as nitrogen may also be used.

Many other variations may be made in the process of this invention. For example, hydrogen may be used in combination with other viscosity reducing agents, as for example, polyhalomethanes such as carbon tetrachloride, carbon tetrabromide, chloroform, etc.

The following examples will illustrate the process of polymerizing olefins in accordance with this invention and some of the many modifications that can be made in this process. As will be seen from these examples, it is possible to select the proper conditions to prepare a polymer of any desired molecular weight by means of the process of this invention. The molecular weight of the polymers produced in these examples is shown by the reduced specific viscosity (RSV) given for each. By the term "reduced specific viscosity" is meant the $\eta$ sp./C. determined on an 0.1% solution of the polymer in decalin, containing 0.1 g. of the polymer per 100 ml. of solution, at 135° C. Where the melting point of the polymer is given, it is the temperature at which the birefringence due to crystallinity disappears. All parts and percentages are by weight unless otherwise indicated.

EXAMPLES 1–3

In each of these examples a series of three polymerization vessels was used; in each series a control was run wherein no hydrogen was added and in the other members of that series varying amounts of hydrogen were added. The polymerizations in each case were carried out by charging to the vessel 33 parts of n-heptane, replacing the air in the polymerization vessel with nitrogen, evacuating, adding the specified amount of hydrogen and ethylene, and after equalizing the temperature of the polymerization vessel at 30° C. adding the catalyst, the aluminum alkyl first and then the titanium component. The catalyst system used in each series was a hydrocarbon-insoluble reaction product of triethylaluminum and titanium tetrachloride used in conjunction with an additional amount of triethylaluminum. The hydrocarbon-insoluble reaction product used in Examples 1 and 2 was prepared by mixing 0.03 part of triethylaluminum with 0.05 part of titanium tetrachloride (molar ratio of 1:1) in 1.4 parts of n-heptane, aging 2 hours at room temperature, filtering off the precipitate, washing the precipitate twice with n-heptane, and resuspending it in n-heptane. The hydrocarbon-insoluble reaction product used in Example 3 was prepared in the same way but from 0.015 part of triethylaluminum and 0.05 part of titanium tetrachloride (a molar ratio of 0.5:1). These suspensions in n-heptane and the aluminum alkyl used in conjunction therewith was then added to the polymerization vessel as described above. The amount of ethylene and mole percent of hydrogen (based on the total gas, i.e., ethylene plus hydrogen) and the pressure in pounds per square inch absolute used in each case are set forth in Table I along with the amount of triethylaluminum (AlEt$_3$) added. Also shown are the reaction time for each polymerization and the final pressure, percent conversion, and RSV of the polymer. As will be seen from these results, a very sharp reduction in the molecular weight of the polymer as indicated by the viscosity was obtained when the polymerization was carried out in the presence of hydrogen.

When the polymerization was substantially complete, 4 parts of anhydrous ethanol was introduced to stop the polymerization. The polymer which had separated as an insoluble precipitate in each case was separated by filtration, washed twice with n-heptane, twice with absolute ethanol, refluxed for 15 minutes with 40 parts of a 10% methanolic solution of hydrogen chloride, filtered, and the polymer was washed with methanol until the filtrate was acid-free. The polymers so obtained were then dried for 4 hours at 80° C. in vacuo.

*Table I*

| Ex. | Ethylene Parts | Ethylene Pressure, p.s.i.a. | Hydrogen Mole percent | Hydrogen Pressure, p.s.i.a. | Aluminum alkyl Added | Aluminum alkyl Parts | Reaction time, hours | Pressure, p.s.i.a. | Percent conv. | RSV | Melting point, °C. |
|---|---|---|---|---|---|---|---|---|---|---|---|
| 1a | 1.9 | 67 | 0 | --- | AlEt$_3$ | 0.06 | 0.25 | 5 | 100 | 9.5 | 137 |
| b | 1.9 | 63 | 2.3 | 3 | AlEt$_3$ | 0.06 | 0.25 | 7 | 94 | 6.3 | --- |
| c | 1.5 | 50 | 14.3 | 17 | AlEt$_3$ | 0.06 | 0.25 | 20 | 93 | 3.2 | 138 |
| 2a | 1.7 | 60 | 0 | --- | AlEt$_3$ | 0.06 | 0.25 | 5 | 92 | 10.2 | --- |
| b | 1.8 | 56 | 13 | 17 | AlEt$_3$ | 0.06 | 0.25 | 22 | 82 | 3.8 | 139 |
| c | 1.0 | 38 | 36 | 35 | AlEt$_3$ | 0.06 | 0.25 | 38 | 99 | 2.7 | 138 |
| 3a | 1.2 | 45 | 0 | --- | AlEt$_3$ | 0.06 | 0.3 | 5 | 100 | 10.0 | --- |
| b | 1.5 | 57 | 16 | 17 | AlEt$_3$ | 0.06 | 0.3 / 0.5 | 22 / 20 | 100 | 3.8 | --- |
| c | 0.9 | 32 | 38 | 35 | AlEt$_3$ | 0.06 | 0.3 / 0.5 | 38 / 37 | 92 | 2.7 | --- |

EXAMPLES 4 AND 5

In these examples the procedure described in Examples 1–3 was repeated except that a lower concentration of the hydrocarbon-insoluble reaction product was used for the polymerizations. In Example 4 one-fifth of the amount of the hydrocarbon-insoluble reaction product prepared from triethylaluminum and titanium tetrachloride used in Examples 1 and 2 was used and in Example 5 one-tenth of the amount of this insoluble reaction product catalyst component was used. The amount of ethylene, hydrogen (mole percent of total gas), triethylaluminum (AlEt$_3$), reaction time, final pressure, percent conversion, and viscosity of the polymers are tabulated in Table II.

EXAMPLE 7

In this example a series of polymerizations was carried out following the procedure of the preceding examples using varying molar ratios in the preparation of the hydrocarbon-insoluble reaction product, with and without additional aluminum alkyl. In series A the hydrocarbon-insoluble reaction product was prepared by mixing 0.02 part of a crude triisobutylaluminum containing about 61% diisobutylaluminum hydride with 0.05 part of titanium tetrachloride (0.5:1 molar ratio); in series B the hydrocarbon-insoluble reaction product was prepared by mixing 0.04 part of the crude triisobutylaluminum with 0.05 part of titanium tetrachloride (1:1 molar ratio); and

Table II

| Ex. | Ethylene | | Hydrogen | | Al alkyl | | Reaction time, hours | Pressure, p.s.i.a. | Percent conv. | RSV |
|---|---|---|---|---|---|---|---|---|---|---|
| | Parts | Pressure, p.s.i.a. | Mole percent | Pressure, p.s.i.a. | Added | Parts | | | | |
| 4a | 1.6 | 60 | | | AlEt$_3$ | 0.06 | 0.50 | 10 | 93 | 22.9 |
| b | 1.6 | 55 | 14 | 17 | AlEt$_3$ | 0.06 | 0.5 / 1.0 | 27 / 22 | 92 | 6.5 |
| c | 1.0 | 40 | 36 | 35 | AlEt$_3$ | 0.06 | 0.5 / 1.0 | 43 / 39 | 95 | 4.1 |
| 5a | 1.7 | 57 | | | AlEt$_3$ | 0.06 | 0.5 / 0.75 | 17 / 11 | 79 | 25.0 |
| b | 1.6 | 55 | 14 | 17 | AlEt$_3$ | 0.06 | 0.5 / 2.8 | 43 / 22 | 91 | 8.3 |

EXAMPLE 6

This example demonstrates the influence of the hydrogen partial pressure on the viscosity reduction. The procedure used for carrying out the polymerizations is the same as that in Examples 1–5 except that a lower concentration of the hydrocarbon-insoluble reaction product was used. In each of the polymerizations of this example the insoluble catalyst component was prepared from 0.003 part of triethylaluminum and 0.01 part of titanium tetrachloride (0.5:1 molar ratio) and used in conjunction with 0.06 part of triethylaluminum. The amount of ethylene and hydrogen (mole percent of total gas) and p.s.i. of absolute pressure are shown in Table III along with the reaction time, final pressure, percent conversion, and viscosity of the polymer. As may be seen from these data, the effectiveness of hydrogen as a viscosity reducer increases with the hydrogen pressure.

in series C the hydrocarbon-insoluble reaction product was prepared by mixing 0.08 part of the crude triisobutylaluminum with 0.05 part of titanium tetrachloride (2:1 molar ratio), in each case the reaction being carried out in 1.4 parts of n-heptane and aged for 2 hours at room temperature. These suspensions were used as such without separating the insoluble reaction product as was done in the foregoing examples. The amount of ethylene and mole percent (based on the total gas, i.e., ethylene plus hydrogen) of hydrogen used in each polymerization (the hydrogen pressure in each case being 17 p.s.i.a.) are set forth in Table IV along with the amount of the crude triisobutylaluminum added and the final pressure in p.s.i.a. after the specified reaction time, the percent conversion, and the viscosity of the polymer.

Table IV

| | Ethylene, parts | Hydrogen, mole percent | A:T Ratio of insoluble catalyst component | Crude triisobutyl Al, parts | Reaction time, hours | Pressure, p.s.i.a. | Percent conv. | RSV |
|---|---|---|---|---|---|---|---|---|
| Series A | 1.7 | 0 | 0.5:1 | 0 | 0.25 | 9 | 92 | 2.1 |
| | 1.5 | 15 | 0.5:1 | 0 | 0.25 | 23 | 99 | 1.3 |
| | 1.6 | 0 | 0.5:1 | 0.08 | 0.25 | 5 | 100 | 14.4 |
| | 1.5 | 15 | 0.5:1 | 0.08 | 0.25 | 21 | 100 | 4.3 |
| Series B | 1.8 | 0 | 1:1 | 0 | 0.75 | 13 | 87 | 14.9 |
| | 1.7 | 13 | 1:1 | 0 | 0.75 | 29 | 87 | 6.6 |
| | 1.8 | 0 | 1:1 | 0.08 | 0.25 | 8 | 92 | 15.9 |
| | 1.8 | 13 | 1:1 | 0.08 | 0.25 | 20 | 81 | 4.2 |
| Series C | 1.8 | 0 | 2:1 | 0 | 0.25 | 8 | 93 | 25.6 |
| | 1.7 | 13 | 2:1 | 0 | 0.25 | 24 | 85 | 8.5 |
| | 1.8 | 0 | 2:1 | 0.08 | 0.25 | 5 | 94 | 18.1 |
| | 1.5 | 15 | 2:1 | 0.08 | 0.25 | 21 | 100 | 6.4 |

EXAMPLE 8

Each of a series of polymerization vessels was charged

Table III

| Ethylene | | Hydrogen | | Reaction time, hours | Pressure, p.s.i.a. | Percent conv. | RSV |
|---|---|---|---|---|---|---|---|
| Parts | Pressure, p.s.i.a. | Mole percent | Pressure, p.s.i.a. | | | | |
| 1.9 | 63 | 0 | | 0.25 | 14 | 79 | 24.6 |
| 1.6 | 57 | 14 | 17 | 0.50 | 27 | 88 | 7.5 |
| 0.4 | 16 | 0 | | 0.25 | 6 | 75 | 14.6 |
| 0.4 | 18 | 11 | 3.3 | 0.25 | 10 | 87 | 8.9 | with 33 parts of n-heptane, the air was replaced with nitrogen, and after evacuating, 2 parts of ethylene was added and varying amounts of hydrogen were added to three of the vessels, the fourth being held as a control with no hydrogen added. Each of the polymerization vessels was then equalized at 30° C. and a mixture of 0.018 part of diethylaluminum chloride and 0.05 part of titanium tetrachloride in 1.4 parts of n-heptane and which had been aged for 2 hours at room temperature was added. The initial pressure in each case was about 65 p.s.i.a. When the polymerization was complete, the polymer was isolated as described in the foregoing examples. The mole percent of hydrogen (based on ethylene plus hydrogen) added in each case, the reaction time required for the pressure to drop to about 15 p.s.i.a., and the viscosity of the polymer are tabulated below:

| Mole Percent H$_2$ | Reaction time | RSV |
|---|---|---|
| 0 | 0.5 | 21.0 |
| 0.6 | 0.9 | 17.4 |
| 1.1 | 0.9 | 16.4 |
| 2.3 | 0.9 | 15.8 | lated as in the foregoing examples. The amount of ethylene and hydrogen (expressed as mole percent of the total gas), reaction time, final total gas pressure, conversion and viscosity of the polymer for each polymerization are shown in Table V. These data demonstrate that the viscosity decreases continuously with increasing mole percent of hydrogen and that the effect of hydrogen on the viscosity increases substantially at the higher levels of hydrogen.

*Table V*

| Ethylene | | Hydrogen | | Reaction time, hours | Pressure, p.s.i.a. | Percent conv. | RSV |
|---|---|---|---|---|---|---|---|
| Parts | Pressure, p.s.i.a. | Mole percent | Pressure, p.s.i.a. | | | | |
| 1.8 | 63 | 0 | -------- | 0.5 | 7 | 93 | 34.4 |
| 1.8 | 66 | 0.30 | 0.36 | 0.5 | 7 | 98 | 33.3 |
| 1.8 | 69 | 0.9 | 1.1 | 0.5 | 9 | 100 | 25.4 |
| 2.0 | 75 | 2.5 | 3.3 | 0.5 | 16 | 98 | 20.9 |
| 1.8 | 60 | 13 | 17 | 0.5 | 27 | 82 | 10.9 |
| 1.3 | 44 | 30 | 35 | 0.25 | 51 | 68 | 8.2 |
| 0.5 | 23 | 53 | 35 | 0.25 | 45 | 79 | 6.3 |
| 0.3 | 12 | 75 | 55 | 0.50 | 56 | 93 | 4.0 |

EXAMPLE 10

Ethylene was polymerized in the presence of hydrogen following the general procedure described in the foregoing examples using n-heptane as the diluent in series A and toluene in series B. In these polymerizations the catalyst used was the mixture of reaction products obtained by reacting 0.1 part of a pure triisobutylaluminum with 0.05 part of titanium tetrachloride (2:1 molar ratio) in 1.4 parts of n-heptane, two of the runs in series A having added, as a second catalyst component, 0.1 part of pure triisobutylaluminum. The amount of ethylene, hydrogen (mole percent of total gas) and aluminum alkyl together with the reaction time, final pressure, conversion and viscosity of the polymer are set forth in Table VI.

*Table VI*

| Ethylene, parts | Hydrogen, mole percent | Triisobutyl-aluminum added (parts) | Reaction time, hours | Pressure, p.s.i.a. | Percent conv. | RSV |
|---|---|---|---|---|---|---|
| SERIES A—N-HEPTANE SOLVENT | | | | | | |
| 1.7 | 0 | 0 | 0.5 | 12 | 92 | 22.6 |
| 1.8 | 13 | 0.1 | 0.25 | 29 | 86 | 7.3 |
| 1.7 | 0 | 0.1 | 0.25 | 7 | 99 | 21.5 |
| 1.8 | 13 | 0.1 | 0.25 | 21 | 92 | 5.0 |
| SERIES B—TOLUENE SOLVENT | | | | | | |
| 1.7 | 0 | 0 | 0 5 | 12 | 88 | 18.8 |
| 1.8 | 13 | 0 | 1.0 | 31 | 76 | 8.2 |

EXAMPLE 9

Each of a series of eight polymerization vessels was charged with 33 parts of n-heptane, the air was replaced with nitrogen and then after evacuating, ethylene and varying amounts of hydrogen were added. The vessels were equalized at 30° C., 0.16 part of a crude triisobutylaluminum containing 61% of diisobutylaluminum hydride was added and then a suspension of the hydrocarbon-insoluble reaction product, produced by reacting 0.016 part of the crude triisobutylaluminum and 0.01 part of titanium tetrachloride (2:1 molar ratio) in 1.4 parts of n-heptane, aging for 2 hours at room temperature, filtering off the precipitate, washing it twice with n-heptane and resuspending it in n-heptane, was added. The polymerization was stopped and the polymer iso-

EXAMPLES 11–21

These examples demonstrate the effectiveness of hydrogen as a viscosity reducing agent in the polymerization of ethylene with a wide variety of catalyst combinations. The procedure used for each polymerization was to charge the vessel with n-heptane (33 parts), replace the air with nitrogen, then evacuate and add the ethylene (1.7 to 1.9 parts) and the indicated amount of hydrogen (expressed as mole percent of the total gas) and after equalizing the vessel at 30° C., add the catalyst, the organometallic compound used as the second catalyst component, if used, first and then the hydrocarbon-insoluble reaction product or the reaction mixture obtained by reacting an organometallic compound with a transition metal compound. In Examples 17, 18 and 21 the reaction mixture obtained by mixing the organometallic compound with the transition metal compound in 1.4 parts of diluent (n-heptane for Example 17 and toluene for Examples 18 and 21) was used as the catalyst after aging for 2 hours at room temperature for Examples 18 and 21 and prepared and aged at Dry Ice temperature for Example 17. In Example 16 a two-component catalyst system was used wherein the reaction mixture prepared by the same procedure as for Examples 18 and 21 but in n-heptane was used as one catalyst component in combination with an organometallic compound as a second catalyst component. In Examples 11–15, 19 and 20 a two-component catalyst system was used wherein the hydrocarbon-insoluble reaction product, produced by reacting the specified organometallic compound with the transition metal compound in 1.4 parts of n-heptane and separated by filtration after aging for 2 hours at room temperature, washed with n-heptane and resuspended in n-heptane, was used as one catalyst component in combination with an added organometallic compound as the second catalyst component. The initial pressure in each case was about 65 p.s.i.a. The organometallic compound and transition metal compound, parts of each and molar ratio, used in preparing the reaction product used as the catalyst and the organometallic compound and amount, if any, used as a second catalyst component are set forth in Table VII along with the mole percent of hydrogen, the reaction time and final pressure, conversion to polymer and viscosity of the polymer. The polymerization was stopped and the polymer isolated in each case by the procedure described in Examples 1–3.

EXAMPLE 22

Each of a series of seven polymerization vessels was charged with 33 parts of n-heptane, the air was replaced with nitrogen, and then after evacuating, propylene and varying amounts of hydrogen were added. After equalizing at 30° C., 0.12 part of triethylaluminum and a suspension in 1.4 parts of n-heptane of the hydrocarbon-insoluble reaction product produced by reacting 0.015 part of triethylaluminum and 0.05 part of titanium tetrachloride were added. The amount of propylene and hydrogen (expressed as mole percent of the total gas) charged to each vessel and the pressure of each, the reaction time and final total gas pressure for each polymerization are tabulated in Table VIII.

At the end of the specified reaction time, the polymerization was stopped by the addition of 4 parts of anhydrous ethanol. In each case both heptane-soluble and heptane-insoluble polymers were produced. The reaction mixture was diluted with n-heptane, washed twice with 10% methanolic hydrogen chloride, and then with methanol until neutral. The insoluble polymer was then separated by filtration, washed, and dried in vacuo at 80° C. for 4 hours. The heptane-soluble polymer was separated from the filtrate by concentration thereof and then precipitating the polymer by adding a large excess of anhydrous ethanol. The polymer so obtained was washed with ethanol and dried for 16 hours at 80° C. in vacuo.

The heptane-insoluble polypropylene produced in each case was a crystalline polymer whereas the heptane-soluble polymer was rubbery. The amount of each produced is shown in Table VIII.

*Table VIII*

| Propylene | | Hydrogen | | Reaction time, hrs. | Pressure, p.s.i.a. | Polymer | | | |
|---|---|---|---|---|---|---|---|---|---|
| | | | | | | Heptane—insoluble | | Heptane—soluble | |
| Parts | Pressure, p.s.i.a. | Mole percent | Pressure, p.s.i.a. | | | Percent conv. | RSV | Percent conv. | RSV |
| 7.8 | 58 | 0 | -------- | 1.6 | 14 | 46 | 5.1 | 34 | 1.9 |
| 7.7 | 58 | 0.11 | 0.36 | 2.0 | 15 | 44 | 3.7 | 35 | 1.4 |
| 7.8 | 58 | 0.22 | 0.72 | 2.0 | 16 | 44 | 3.1 | 31 | 1.0 |
| 7.3 | 58 | 0.72 | 2.2 | 2.5 | 18.5 | 43 | 2.4 | 34 | 0.8 |
| 6.6 | 55 | 1.83 | 5.1 | 2.5 | 21.5 | 42 | 1.7 | 27 | 0.7 |
| 5.6 | 44 | 6.8 | 17 | 2.5 | 27 | 35 | 1.2 | 26 | 0.5 |
| 3.6 | 29 | 19.6 | 35 | 1.0 | 44 | 26 | 0.8 | 19 | 0.5 |

As may be seen from the data in this table, the viscosity of both the crystalline and the rubbery polymer is de-

*Table VII[1]*

| Ex. No. | Catalyst component formed from— | | | | | Organometallic catalyst component | | Mole percent H₂ | Reaction time, hours | Pressure, p.s.i.a. | Percent conv. | RSV |
|---|---|---|---|---|---|---|---|---|---|---|---|---|
| | Organometallic compound | Parts | Transition metal compound | Parts | A:T Molar ratio | Added | Parts | | | | | |
| 11 | AlEt₃ | 0.03 | TiCl₄ | 0.05 | 1:1 | ²Al(iBu)₃ | 0.10 | 0 | 0.25 | 6 | 87 | 9.2 |
|  | AlEt₃ | 0.03 | TiCl₄ | 0.05 | 1:1 | ²Al(iBu)₃ | 0.10 | 13 | 0.5 | 20 | 90 | 5.1 |
| 12 | AlEt₃ | 0.015 | TiCl₄ | 0.05 | 0.5:1 | AlEt₂Cl | 0.06 | 0 | 0.5 | 13 | 83 | 19.6 |
|  | AlEt₃ | 0.015 | TiCl₄ | 0.05 | 0.5:1 | AlEt₂Cl | 0.06 | 15 | 0.75 | 25 | 85 | 9.2 |
| 13 | AlEt₃ | 0.015 | TiCl₄ | 0.05 | 0.5:1 | MgEt₂ | 0.094 | 0 | 0.25 | 13 | 85 | 23.8 |
|  | AlEt₃ | 0.015 | TiCl₄ | 0.05 | 0.5:1 |  |  | 14 | 0.5 | 28 | 82 | 8.2 |
| 14 | AlEt₂Cl | 0.06 | TiCl₄ | 0.05 | 2:1 | ²Al(iBu)₃ | 0.08 | 0 | 0.25 | 14 | 81 | 21.4 |
|  | AlEt₂Cl | 0.06 | TiCl₄ | 0.05 | 2:1 | ²Al(iBu)₃ | 0.08 | 13 | 0.5 | 25 | 87 | 9.4 |
| 15 | AlEt₂Cl | 0.06 | TiCl₄ | 0.05 | 2:1 | Amyl Na | 0.094 | 0 | 0.25 | 13 | 89 | 25.8 |
|  | AlEt₂Cl | 0.06 | TiCl₄ | 0.05 | 2:1 | Amyl Na | 0.094 | 13 | 0.5 | 24 | 87 | 11.4 |
| 16 | AlEt₃ | 0.06 | Ti(OCH₃)₄ | 0.03 | 2.7:1 | ²Al(iBu)₃ | 0.08 | 0 | 19 | 15 | 34 | 37.6 |
|  | AlEt₃ | 0.06 | Ti(OCH₃)₄ | 0.03 |  | ²Al(iBu)₃ | 0.08 | 13 | 3.0 | 29 | 5.6 | 4.1 |
| 17 | BuLi | 0.03 | TiCl₄ | 0.04 | ³2:1 | None |  | 0 | 0.75 | 11 | 90 | 50.0 |
|  | BuLi | 0.03 | TiCl₄ | 0.04 | ³2:1 | None |  | 13 | 0.75 | 29 | 86 | 12.8 |
| 18 | AlEt₂Cl | 0.18 | CrA₃ | 0.09 | 6:1 | None |  | 0 | 0.75 | 15 | 85 | 22.0 |
|  | AlEt₂Cl | 0.18 | CrA₃ | 0.09 | 6:1 | None |  | 13 | 2.8 | 31 | 77 | 4.2 |
| 19 | AlEt₂Cl | 0.18 | VOA₂ | 0.06 | 6:1 | AlEt₃ | 0.06 | 0 | 2.5 | 13 | 91 | 17.0 |
|  | AlEt₂Cl | 0.18 | VOA₂ | 0.06 | 6:1 | AlEt₃ | 0.06 | 13 | 19 | 33 | 72 | 4.6 |
| 20 | AlEt₂Cl | 0.18 | ZrCl₄ | 0.06 | 6:1 | AlEt₃ | 0.06 | 0 | 1.0 | 12 | 77 | 50.6 |
|  | AlEt₂Cl | 0.18 | ZrCl₄ | 0.06 | 6:1 | AlEt₃ | 0.06 | 13 | 1.0 | 29 | 76 | 27.5 |
| 21 | AlEt₂Cl | 0.36 | FeA₃ | 0.16 | 6:1 | None |  | 0 | 43 | (⁴) | 3.2 | 48.6 |
|  | AlEt₂Cl | 0.36 | FeA₃ | 0.16 | 6:1 | None |  | 13 | 43 | (⁴) | 1.0 | 5.7 |

[1] Abbreviations used are: A=acetylacetonate, Bu=n-butyl, Et=ethyl, and iBu=isobutyl.
[2] Contained 61% diisobutylaluminum hydride.
[3] Half of this reaction mixture added at beginning and the other half added 30 minutes later.
[4] 6 lb. drop.

creased progressively with increasing hydrogen. The data also demonstrate the extreme sensitivity of propylene polymerization to hydrogen.

EXAMPLE 23

Two polymerization vessels were each charged with 33 parts of n-heptane and after replacing the air with nitrogen and evacuating, propylene was added and to one hydrogen was also added. After equalizing at 30° C., 0.12 part of triethylaluminum was added and then the mixture of reaction products produced by reacting 0.12 part of monoethylaluminum dichloride with 0.05 part of titanium tetrachloride in 1.4 parts of n-heptane. The polymerization was stopped after 18.5 hours and the crystalline and rubbery polymers were isolated as described in Example 22. The amount of propylene and hydrogen (expressed as mole percent of the total gas), final total gas pressure, conversion to crystalline and rubbery polymer and the viscosity of each are tabulated below:

of hydrogen in the polymerization of octene-1 and buten-1 and on the copolymerization of octene-1 with styrene and of propylene with isoprene. The hydrocarbon-insoluble reaction product catalyst component used in each of these examples was prepared in the usual manner by mixing solutions of the organometallic compound and transition metal compound in n-heptane, separating the precipitate, washing it with n-heptane, and resuspending it in n-heptane. The same general procedure used in the foregoing examples was used here, each vessel being charged with the diluent (33 parts of n-heptane except in Example 27 where only 6.8 parts was used), then the olefin or olefins, hydrogen (expressed as mole percent of the total monomer or monomers plus hydrogen), the organo-metallic compound being used as one catalyst component and finally the hydrocarbon-insoluble reaction product used as the other catalyst component. The polymer or polymers, if both a soluble and insoluble polymer were formed, were isolated in the

| Propylene | | Hydrogen | | Final pressure, p.s.i.a. | Isolated polymer | | | |
|---|---|---|---|---|---|---|---|---|
| | | | | | Heptane—insoluble | | Heptane—soluble | |
| Parts | Pressure, p.s.i.a. | Mole percent | Pressure, p.s.i.a. | | Percent conv. | RSV | Percent conv. | RSV |
| 5.7 | 48 | 0 | ---- | 15 | 78 | 19.5 | 4.1 | 0.8 |
| 5.5 | 43 | 6.9 | 17 | 34 | 59 | 2.2 | 1.9 | 0.3 |

EXAMPLE 24

A series of three polymerization vessels was charged with 33 parts of n-heptane and 10 parts butadiene. To one vessel was added 4.5 mole percent of hydrogen (17 p.s.i.a.) based on the total monomer plus hydrogen and to a second vessel was added 8.7 mole percent of hydrogen (35 p.s.i.a.), and to the third no hydrogen was added as a control. After equalizing at 30° C., 0.34 part of triethylaluminum and 0.17 part of titanium tetrabutoxide were added. In the case where no hydrogen was added, there was obtained at the end of 2 hours a conversion of 44%, the product being a very viscous highly swollen gel. In the case where 4.5 mole percent of hydrogen was added, there was obtained a 22.5% conversion after 7.5 hours and the product was fluid with some gel present. In the case where 8.7 mole percent of hydrogen was present, there was obtained a conversion of 54% at the end of 23 hours and the product was fluid although somewhat grainy and the final pressure was 13 p.s.i.a.

EXAMPLES 25–28

These examples illustrate the viscosity reducing effect usual manner. The amount of each reactant, reaction time and viscosity of the polymers obtained are tabulated in Table IX. In each example, the polymer produced with the use of added hydrogen had a lower viscosity than that produced without added hydrogen. The polyoctenes produced in Example 25 were rubbery, heptane-soluble polymers. In Example 26 both a heptane-soluble and a heptane-insoluble polymer were produced, the latter being a crystalline solid having a melting point of 115° C. The copolymer of octene-1 and styrene formed in Example 27 was soluble in heptane and on analysis was found to contain about 18% styrene. Both a soluble and an insoluble copolymer were formed in Example 28, the soluble copolymer being rubbery and containing about 25% isoprene.

Table IX

| Ex. No. | Monomer | Parts | Reaction product catalyst component formed from— | | | | Organometallic compound | | Hydrogen | | Reaction time, hours | Polymer RSV heptane- | |
|---|---|---|---|---|---|---|---|---|---|---|---|---|---|
| | | | Al alkyl | Parts | TiCl₄, parts | A:T, Ratio | Added | Parts | Mole percent | Pressure, p.s.i.a. | | Insolu. | Solu. |
| 25 | Octene-1 | 10 | AlEt₃ | 0.014 | 0.05 | 0.5:1 | AlEt₃ | 0.12 | 0 | ᵃ 20 | 19 | ---- | 1.4 |
|  | Octene-1 | 10 | AlEt₃ | 0.014 | 0.05 | 0.5:1 | AlEt₃ | 0.12 | 13 | 20 | 19 | ---- | 0.8 |
| 26 | Butene-1 | 10 | AlEt₃ | 0.03 | 0.10 | 0.5:1 | Al(iBu)₃ ᵇ | 0.16 | 6 | 17 | 19 | 1.48 | 0.3 |
| 27 | Octene-1 + | 5 | ---- | ---- | ---- | ---- | ---- | ---- | ---- | ---- | ---- | ---- | ---- |
|  | Styrene | 5 | AlEt₃ | 0.03 | 0.10 | 0.5:1 | Al(iBu)₃ | 0.2 | 0 | ᵃ 20 | 0.4 | ---- | 1.6 |
|  | Styrene | 5 | AlEt₃ | 0.03 | 0.10 | 0.5:1 | Al(iBu)₃ | 0.2 | 1.2 | 20 | 1.4 | ---- | 0.4 |
| 28 | Propylene + | 6.2 | ---- | ---- | ---- | ---- | ---- | ---- | ---- | ---- | ---- | ---- | ---- |
|  | Isoprene | 2.1 | AlEt₁Cl | 0.06 | 0.05 | 2:1 | Al(iBu)₃ | 0.2 | 0 | ---- | 19 | 6.7 | 1.8 |
|  | Propylene + | 5.5 | ---- | ---- | ---- | ---- | ---- | ---- | ---- | ---- | ---- | ---- | ---- |
|  | Isoprene | 2.0 | AlEt₂Cl | 0.06 | 0.05 | 2:1 | Al(iBu)₃ | 0.2 | 6.9 | 17 | 19 | 1.3 | 0.4 |

ᵃ Nitrogen.
ᵇ Contained 61% diisobutylaluminum hydride.

EXAMPLE 29

The catalyst used in this example was prepared by mixing 10 parts of diethylaluminum chloride with 1 part of anhydrous manganous chloride in n-heptane under nitrogen in a ball mill. This catalyst suspension was then mixed with 84 parts of ethylene containing 5 mole percent of hydrogen in an autoclave. On heating to 100° C. the pressure was 90 atm. (10 atm. hydrogen pressure). After 60 hours the polymer was isolated in the usual fashion. It had a much lower viscosity than that prepared without hydrogen.

EXAMPLE 30

The catalyst used in this example was prepared by mixing in 40 parts of n-heptane, under nitrogen, 7.9 parts of triisobutylaluminum with the washed hydrocarbon-insoluble reaction product formed from 3.8 parts of titanium tetrachloride and 2.6 parts of diethylaluminum chloride in 25 parts of n-heptane and aged for 45 minutes at room temperature. The polymerization vessel was charged with 1360 parts of n-heptane. After applying a vacuum to the vessel, ethylene was bubbled through the liquid at atmospheric pressure. The mixture was heated to 50° C. and polymerization was started by adding 10% of the above catalyst mixture. The temperature was held at 50° C. and ethylene was added on demand at atmospheric pressure so as to provide a constant gas purge from the system. At 20-minute intervals, an additional 10% of the catalyst mixture was added until all was used. At the end of the run (240 minutes), 500 parts of an equal mixture of isopropanol and toluene was added. The polymer was then separated by filtration, washed with isopropanol, then with methanol and finally dried. There was obtained 260 parts of polyethylene having an RSV of 62.4.

The above procedure was repeated except that 10 mole percent of hydrogen was added to the ethylene stream. A yield of 238 parts of polymer having an RSV of 15.6 was obtained.

The procedure was again repeated except that the polymerization was carried out at 80° C. and the catalyst was all added at the beginning. The polymer so obtained had an RSV of 6.2 and amounted to 238 parts.

EXAMPLE 31

A polymerization vessel was charged with 150 parts of n-heptane (nitrogen atmosphere) and, after evacuating, hydrogen (65 p.s.i.a.) and ethylene (100 p.s.i.a.) were added followed by 0.8 part of triisobutylaluminum and then the washed hydrocarbon-insoluble reaction product obtained by mixing 0.38 part of titanium tetrachloride with 0.4 part of triisobutylaluminum in n-heptane. The polymerization was carried out for 2 hours at about 35° C., the system being purged once in the middle of the run. The polymer was isolated in the usual manner as described in the foregoing examples. There was obtained 39 parts of polyethylene having an RSV of 3.6.

EXAMPLE 32

To each of two polymerization vessels (nitrogen atmosphere) was charged 1.5 parts of n-heptane and 10 parts of styrene. Hydrogen was added to one of the vessels to a pressure of 35 p.s.i.a. and after equalizing the vessels at 30° C., there was added 0.20 part of pure triisobutyl-aluminum in 2.7 parts of n-heptane followed by a slurry of the hydrocarbon-insoluble reaction product obtained by mixing 0.075 part of pure triisobutylaluminum with 0.095 part of titanium tetrachloride (0.75:1 molar ratio) in 2.7 parts of n-heptane, this insoluble reaction product having been prepared in n-heptane, aged for 2 hours at room temperature, separated and washed with n-heptane and finally reslurried in n-heptane. After 19 hours (final pressure of 10 p.s.i.a. in the system where hydrogen was added), 4 parts of anhydrous ethanol was added to each of the polymerization systems and the insoluble polymer that had formed was separated by filtration. The polymeric product was washed with toluene under nitrogen 4 times, then was refluxed for 15 minutes with 40 parts of a 10% methanolic solution of hydrogen chloride, separated by filtration, washed acid-free with methanol, and finally was dried in vacuo for 4 hours at 80° C. The toluene-insoluble polystyrene produced in the absence of added hydrogen amounted to a conversion of 12% and had a reduced specific viscosity of 9.9 (determined on an 0.1% solution of the polymer in α-chloronaphthalene at 135° C.). The toluene-insoluble polystyrene produced in the presence of added hydrogen amounted to a conversion of 8% and had a reduced specific viscosity of 4.8 (determined on an 0.1% solution of the polymer in α-chloronaphthalene at 135° C.).

The foregoing examples demonstrate the effectiveness of hydrogen as a viscosity reducing agent in the polymerization of olefins under a wide variety of polymerization conditions. Obviously many other variations may be made. Hence, the process of this invention enables the use of the most active catalyst combinations for the polymerization of olefins and still obtain a product having a molecular weight or viscosity in the desired range.

What I claim and desire to protect by Letters Patent is:

1. In a process for the polymerization of ethylenically unsaturated hydrocarbons wherein at least one ethylenically unsaturated hydrocarbon is contacted with at least a catalytic amount of a catalyst, formed by mixing a compound of a metal selected from the group consisting of metals of groups IV–B, V–B, VI–B and VIII of the periodic table and manganese, with an organometallic compound of a metal selected from the group consisting of alkali metals, alkaline earth metals, zinc, earth metals and the rare earth metals, the step of adding hydrogen, in an amount of at least about 0.001 mole percent of said unsaturated hydrocarbons, to the polymerization system.

2. The process of claim 1 wherein the ethylenically unsaturated hydrocarbon is a monoethylenically unsaturated hydrocarbon.

3. The process of claim 1 wherein the ethylenically unsaturated hydrocarbon is a conjugated diolefin.

4. The process of claim 2 wherein the monoethylenically unsaturated hydrocarbon is ethylene.

5. The process of claim 2 wherein the monoethylenically unsaturated hydrocarbon is propylene.

6. In a process for the copolymerization of at least two ethylenically unsaturated hydrocarbons wherein a mixture of at least two ethylenically unsaturated hydrocarbons is contacted with at least a catalytic amount of a catalyst, formed by mixing a compound of a metal selected from the group consisting of metals of groups IV–B, V–B, VI–B and VIII of the periodic table and manganese, with an organometallic compound of a metal selected from the group consisting of alkali metals, alkaline earth metals, zinc, earth metals and the rare earth metals, the step of adding hydrogen, in an amount of at least about 0.001 mole percent of said unsaturated hydrocarbons, to the polymerization system.

7. In a process for the polymerization of at least one monoethylenically unsaturated hydrocarbon containing a vinyl group wherein the said unsaturated hydrocarbon is contacted with at least a catalytic amount of a two-component catalyst composition comprising (1) the hydrocarbon-insoluble reaction product, produced by the reaction of a compound of a metal selected from the group consisting of metals of groups IV–B, V–B, VI–B and VIII of the periodic table and manganese with an organometallic compound of a metal selected from the group consisting of alkali metals, alkaline earth metals, zinc, earth metals and the rare earth metals, and (2) an organometallic compound of a metal selected from the group consisting of alkali metals, alkaline earth metals, zinc, earth metals and the rare earth metals, the step of adding hydrogen, in an amount of at least about 0.001 mole percent of said unsaturated hydrocarbons, to the polymerization system.

8. In a process for the polymerization of at least one monoethylenically unsaturated hydrocarbon containing a vinly group wherein the said unsaturated hydrocarbon is contacted with at least a catalytic amount of a two-component catalyst composition comprising (1) the reaction mixture produced by the reaction of a compound of a metal selected from the group consisting of metals of groups IV–B, V–B, VI–B and VIII of the periodic table and manganese with an organometallic compound of a metal selected from the group consisting of alkali metals, alkaline earth metals, zinc, earth metals and the rare earth metals, and (2) a halogen-free organometallic compound of a metal selected from the group consisting of alkali metals, alkaline earth metals, zinc, earth metals and the rare earth metals, the step of adding hydrogen, in an amount of at least about 0.001 mole percent of said unsaturated hydrocarbons, to the polymerization system.

9. In a process for the polymerization of a linear 1-olefin wherein the said olefin is contacted with at least a catalytic amount of a catalyst, formed by mixing titanium tetrachloride with an organoaluminum compound, the step of adding hydrogen, in an amount of at least about 0.001 mole percent of said olefin, to the polymerization system.

10. The process of claim 9 wherein the linear 1-olefin is ethylene.

11. In a process for the polymerization of a linear 1-olefin wherein the said olefin is contacted with at least a catalytic amount of a two-component catalyst composition comprising (1) the hydrocarbon-insoluble reaction product produced by the reaction of titanium tetrachloride with an organoaluminum compound, and (2) an organoaluminum compound, the step of adding hydrogen, in an amount of at least about 0.001 mole percent of said olefin, to the polymerization system.

12. The process of claim 11 wherein the linear 1-olefin is ethylene.

13. The process of claim 11 wherein the linear 1-olefin is propylene.

14. In a process for the polymerization of a linear 1-olefin wherein the said olefin is contacted with at least a catalytic amount of a two-component catalyst composition comprising (1) the reaction mixture produced by the reaction of a titanium compound with an organoaluminum compound, and (2) a halogen-free alkylaluminum compound, the step of adding hydrogen, in an amount of at least about 0.001 mole percent of said olefin, to the polymerization system.

15. The process of claim 14 wherein the linear 1-olefin is ethylene.

16. The process of claim 14 wherein the linear 1-olefin is propylene.

17. In a process for the polymerization of ethylenically unsaturated hydrocarbons wherein at least one ethylenically unsaturated hydrocarbon is contacted with at least a catalytic amount of a catalyst, formed by mixing a compound of a metal of group 4–B of the periodic table, with an organometallic compound, the step of adding hydrogen, in an amount of at least about 4.0 mole percent of said unsaturated hydrocarbons, to the polymerization system.

18. In a process for the polymerization of ethylene wherein ethylene is contacted with at least a catalytic amount of a catalyst formed by mixing a halide of titanium and an organometallic compound wherein the metal is a metal of group III of the periodic table, the step of adding gaseous hydrogen to the polymerization system in an amount sufficient to control the molecular weight of the polyethylene.

19. In a process for the polymerization of ethylene wherein ethylene is contacted with at least a catalytic amount of a catalyst formed by mixing a halide of titanium and an organoaluminum compound, the step of adding gaseous hydrogen to the polymerization system in an amount sufficient to control the molecular weight of the polyethylene.

20. In a process for the polymerization of ethylene wherein ethylene is contacted with at least a catalytic amount of a catalyst formed by mixing a halide of titanium and an aluminum hydrocarbon compound, the step of adding gaseous hydrogen to the polymerization system in an amount sufficient to control the molecular weight of the polyethylene.

21. In a process for the polymerization of an ethylenically unsaturated hydrocarbon wherein the hydrocarbon is contacted with at least a catalytic amount of a catalyst formed by mixing a halide of titanium and an organoaluminum compound, the step of adding gaseous hydrogen to the polymerization system in an amount sufficient to control the molecular weight of the polymer.

22. In a process for the polymerization of propylene wherein propylene is contacted with at least a catalytic amount of a catalyst formed by mixing a halide of titanium and an organoaluminum compound, the step of adding gaseous hydrogen to the polymerization system in an amount sufficient to control the molecular weight of the propylene.

23. In a process for the polymerization of an ethylenically unsaturated hydrocarbon wherein the hydrocarbon is contacted with at least a catalytic amount of a catalyst formed by mixing a halide of titanium and an organometallic compound wherein the metal is a metal of group III of the periodic table, the step of adding gaseous hydrogen to the polymerization system in an amount sufficient to control the molecular weight of the polymer.

References Cited in the file of this patent

UNITED STATES PATENTS

| | | |
|---|---|---|
| 2,446,619 | Stewart et al. | Aug. 10, 1948 |
| 2,666,756 | Boyd | Jan. 19, 1954 |
| 2,721,189 | Anderson et al. | Oct. 18, 1955 |

FOREIGN PATENTS

| | | |
|---|---|---|
| 533,362 | Belgium | May 16, 1955 |

UNITED STATES PATENT OFFICE
CERTIFICATE OF CORRECTION

Patent No. 3,051,690                    August 28, 1962

Edwin J. Vandenberg

It is hereby certified that error appears in the above numbered patent requiring correction and that the said Letters Patent should read as corrected below.

Column 4, line 61, for "reated" read -- reacted --; columns 5 and 6, Table I, sixth column, line 7 thereof, for "$AlEt_4$" read -- $AlEt_3$ --; columns 13 and 14, Table IX, fourth column, line 8 thereof, for "$AlEt_1Cl$" read -- $AlEt_2Cl$ --; same Table IX, twelfth column, in the heading thereof, for "bours" read -- hours --; column 16, line 74, for "vinly" read -- vinyl --.

Signed and sealed this 4th day of December 1962.

(SEAL)
Attest:

ERNEST W. SWIDER                           DAVID L. LADD

Attesting Officer                              Commissioner of Patents